(12) United States Patent
Price et al.

(10) Patent No.: US 9,500,283 B1
(45) Date of Patent: Nov. 22, 2016

(54) FOOT VALVE APPARATUS

(71) Applicant: REDFISH RENTALS, INC., Houma, LA (US)

(72) Inventors: Lee Price, Morgan City, LA (US); Steven Desormeaux, Vidor, TX (US); Johnny Kiser, Iowa, LA (US); Rod Morrison, Morgan City, LA (US)

(73) Assignee: REDFISH RENTALS, INC., Houma, LA (US)

( * ) Notice: Subject to any disclaimer, the term of this patent is extended or adjusted under 35 U.S.C. 154(b) by 0 days.

(21) Appl. No.: 14/556,788

(22) Filed: Dec. 1, 2014

Related U.S. Application Data

(60) Provisional application No. 62/015,729, filed on Jun. 23, 2014.

(51) Int. Cl.
  *F16K 31/00* (2006.01)
  *F16K 1/20* (2006.01)
  *F16K 31/46* (2006.01)

(52) U.S. Cl.
  CPC ........... *F16K 1/2007* (2013.01); *F16K 31/465* (2013.01)

(58) Field of Classification Search
  CPC .......................... F16K 1/2007; F16K 31/465
  See application file for complete search history.

(56) References Cited

U.S. PATENT DOCUMENTS 1,606,278 A * 11/1926 Wheaton, Jr. ......... F16K 1/2007
                                                      251/147
2,145,441 A    1/1939 Groen
(Continued)

FOREIGN PATENT DOCUMENTS

EP        0289247      11/1988

*Primary Examiner* — Craig Schneider
*Assistant Examiner* — Kevin Barss
(74) *Attorney, Agent, or Firm* — Garvey, Smith, Nehrbass & North, L.L.C.; Charles C. Garvey, Jr.; Vanessa M. D'Souza

(57) ABSTRACT

A foot or float valve apparatus provides a valve housing having an upper flange, a lower flange and a cylindrical section, the valve housing having an exterior and an interior with a flow bore having a central axis. The upper flange has a periphery, an upper larger diameter central opening and a plurality of circumferentially spaced smaller diameter upper openings, each smaller diameter upper opening being spaced in between the periphery and the larger diameter upper opening. The lower flange has a periphery, a lower larger diameter central opening and a plurality of circumferentially spaced smaller diameter lower openings, each smaller diameter lower opening spaced in between the periphery and the lower larger diameter opening. The cylindrical section has upper and lower end portions, wherein the upper end portion contacts the upper flange in between the upper larger diameter central opening and the plurality of circumferentially spaced smaller diameter upper openings. The lower end portion contacts the lower flange in between the lower larger diameter central opening and the plurality of circumferentially spaced smaller diameter lower openings. A valving member is pivotally mounted to the valve housing with a pivotal connection that is next to the lower end portion of the cylindrical section and movable between open flow and closed flow positions, wherein the lower flange provides a valve seat that is spaced inwardly of the cylindrical section, the valving member engaging the seat in the closed flow position. A cable is connected to the valving member opposite the pivotal connection, the cable extending diagonally with respect to the bore central axis and forming an acute angle therewith. A cable opening extends through the upper flange at a position vertically above the pivotal connection. The cable extends from the first position to a second position, passing through the cable opening nearer the second position and spaced away from the first position. A cable handle on the cable at the second position that enables a user to grasp the handle and pull the cable.

10 Claims, 7 Drawing Sheets

(56) References Cited

U.S. PATENT DOCUMENTS

| | | | | |
|---|---|---|---|---|
| 2,534,942 A * | 12/1950 | Barling | ............... | E03D 1/308 |
| | | | | 4/387 |
| 2,733,889 A * | 2/1956 | Mattingly | ............ | F24F 13/1406 |
| | | | | 126/292 |
| 3,035,598 A * | 5/1962 | McInerney | ............ | F16K 1/2028 |
| | | | | 137/240 |
| 3,581,763 A | 6/1971 | Smith | | |
| 3,654,942 A * | 4/1972 | Mayer | ................ | F16K 31/44 |
| | | | | 137/1 |
| 4,080,106 A | 3/1978 | Haesloop | | |
| 4,099,551 A * | 7/1978 | Billington | ............ | B67D 7/36 |
| | | | | 137/38 |
| 4,152,264 A | 5/1979 | Hanna, Sr. | | |
| 4,266,614 A | 5/1981 | Fredd | | |
| 4,915,122 A * | 4/1990 | Ikegaya | ............. | F16K 17/363 |
| | | | | 137/38 |
| 5,392,806 A | 2/1995 | Gallant | | |
| 7,281,279 B2 | 10/2007 | Shieh | | |
| 2008/0011487 A1 | 1/2008 | Bertane et al. | | |
| 2008/0083464 A1* | 4/2008 | Shimizu | ............ | E03F 1/006 |
| | | | | 137/527 |

* cited by examiner

FOOT VALVE APPARATUS

CROSS-REFERENCE TO RELATED APPLICATIONS

This application claims the benefit of U.S. Provisional Patent Application Ser. No. 62/015,729, filed 23 Jun. 2014, which is hereby incorporated herein by reference. Priority of U.S. Provisional Patent Application Ser. No. 62/015,729, filed 23 Jun. 2014, which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved foot or float valve apparatus.

2. General Background of the Invention

Cavitation is the formation of vapour cavities in a liquid, i.e. small liquid-free zones ("bubbles" or "voids") that are the consequence of forces acting upon the liquid. Cavitation usually occurs when a liquid is subjected to rapid changes of pressure that cause the formation of cavities where the pressure is relatively low. When subjected to higher pressure, the voids implode and can generate an intense shockwave.

Cavitation is a significant cause of wear in some engineering contexts. Collapsing voids that implode near to a metal surface cause cyclic stress through repeated implosion. This results in surface fatigue of the metal causing a type of wear also called "cavitation". The most common examples of this kind of wear are to pump impellers, and bends where a sudden change in the direction of liquid occurs. Cavitation is usually divided into two classes of behavior: inertial (or transient) cavitation and non-inertial cavitation.

Inertial cavitation is the process where a void or bubble in a liquid rapidly collapses, producing a shock wave. Inertial cavitation occurs in man-made objects, it can occur in control valves, pumps, propellers and impellers.

Non-inertial cavitation is the process in which a bubble in a fluid is forced to oscillate in size or shape due to some form of energy input, such as an acoustic field. Such cavitation is often employed in ultrasonic cleaning baths and can also be observed in pumps, propellers, etc.

Since the shock waves formed by collapse of the voids are strong enough to cause significant damage to moving parts, cavitation is usually an undesirable phenomenon. It is very often specifically avoided in the design of machines such as turbines or propellers, and eliminating cavitation is a major field in the study of fluid dynamics. However, it is sometimes useful and does not cause damage when the bubbles collapse away from machinery, such as in supercavitation.

Suction cavitation occurs when the pump suction is under a low-pressure/high-vacuum condition where the liquid turns into a vapor at the eye of the pump impeller. This vapor is carried over to the discharge side of the pump, where it no longer sees vacuum and is compressed back into a liquid by the discharge pressure. This imploding action occurs violently and attacks the face of the impeller. An impeller that has been operating under a suction cavitation condition can have large chunks of material removed from its face or very small bits of material removed, causing the impeller to look sponge like. Both cases will cause premature failure of the pump, often due to bearing failure. Suction cavitation is often identified by a sound like gravel or marbles in the pump casing.

In automotive applications, a clogged filter in a hydraulic system (power steering, power brakes) can cause suction cavitation making a noise that rises and falls in synch with engine revolutions per minute or RPM. It is fairly often a high pitched whine, like set of nylon gears not quite meshing correctly.

Discharge cavitation occurs when the pump discharge pressure is extremely high, normally occurring in a pump that is running at less than 10% of its best efficiency point. The high discharge pressure causes the majority of the fluid to circulate inside the pump instead of being allowed to flow out the discharge. As the liquid flows around the impeller, it must pass through the small clearance between the impeller and the pump housing at extremely high velocity. This velocity causes a vacuum to develop at the housing wall (similar to what occurs in a venturi), which turns the liquid into a vapor. A pump that has been operating under these conditions shows premature wear of the impeller vane tips and the pump housing. In addition, due to the high pressure conditions, premature failure of the pump's mechanical seal and bearings can be expected. Under extreme conditions, this can break the impeller shaft.

Discharge cavitation in joint fluid is thought to cause the popping sound produced by bone joint cracking, for example by deliberately cracking one's knuckles.

Since all pumps require well-developed inlet flow to meet their potential, a pump may not perform or be as reliable as expected due to a faulty suction piping layout such as a close-coupled elbow on the inlet flange. When poorly developed flow enters the pump impeller, it strikes the vanes and is unable to follow the impeller passage. The liquid then separates from the vanes causing mechanical problems due to cavitation, vibration and performance problems due to turbulence and poor filling of the impeller. This results in premature seal, bearing and impeller failure, high maintenance costs, high power consumption, and less-than-specified head and/or flow.

To have a well-developed flow pattern, pump manufacturer's manuals recommend about 10 diameters of straight pipe run upstream of the pump inlet flange. Unfortunately, piping designers and plant personnel must contend with space and equipment layout constraints and usually cannot comply with this recommendation. Instead, it is common to use an elbow close-coupled to the pump suction which creates a poorly developed flow pattern at the pump suction.

With a double-suction pump tied to a close-coupled elbow, flow distribution to the impeller is poor and causes reliability and performance shortfalls. The elbow divides the flow unevenly with more channeled to the outside of the elbow. Consequently, one side of the double-suction impeller receives more flow at a higher velocity and pressure while the starved side receives a highly turbulent and potentially damaging flow. This degrades overall pump performance (delivered head, flow and power consumption) and causes axial imbalance which shortens seal, bearing and impeller life.

The following possibly relevant U.S. Patents and Publications are listed below, each incorporated herein by reference:

| Pat. No. | Title | Issue/Publ. Date MM/DD/YYYY |
|---|---|---|
| 2,145,441 | Foot Valve Extractor | 01/31/1939 |
| 3,581,763 | Low Water Control Device for a Well Foot Valve | 06/01/1971 |
| 4,080,106 | Purged Valve Assembly and Method of Sealing | 03/21/1978 |
| 4,152,264 | Lake Pump Section Mechanism | 05/01/1979 |
| 4,266,614 | Valve | 05/12/1981 |
| 5,392,806 | Foot Valve Assembly for Lake and River Water Intake | 02/28/1995 |
| 7,281,279 | Drain Valve | 10/16/2007 |
| 2008/0011487 | Drive Piston and Foot Valve Seat | 01/17/2008 |

BRIEF SUMMARY OF THE INVENTION

The present invention provides an improved foot or float valve apparatus. The apparatus includes a valve housing having an upper flange, a lower flange and a cylindrical section, the valve housing having an exterior and an interior with a flow bore having a central axis.

The upper flange has a periphery, an upper larger diameter central opening and a plurality of circumferentially spaced smaller diameter upper openings, each smaller diameter opening being spaced in between the periphery and the larger diameter opening.

The lower flange has a periphery, a lower larger diameter central opening and a plurality of circumferentially spaced smaller diameter lower openings, each smaller diameter opening spaced in between the periphery and the larger diameter opening.

The cylindrical section has upper and lower end portions, wherein the upper end portion contacts the upper flange in between the upper larger diameter central opening and the plurality of circumferentially spaced smaller diameter upper openings.

The lower end portion contacts the lower flange in between the lower larger diameter central opening and the plurality of circumferentially spaced smaller diameter lower openings.

A valving member can be pivotally mounted to the valve housing with a pivotal connection that is next to the lower end portion of the cylindrical section. The valving member can be movable between open flow and closed flow positions, wherein the lower flange provides a valve seat that can be spaced inwardly of the cylindrical section, the valving member engaging the seat in the closed flow position.

A cable can be connected to the valving member opposite the pivotal connection, the cable extending diagonally with respect to the housing bore central axis and forming an acute angle therewith.

A cable opening can be through the upper flange at a position vertically above the pivotal connection.

The cable can extend from the first position to a second position, passing through the cable opening nearer the second position and spaced away from the first position.

A cable handle can be provided on the cable at the second position. The handle or loop enables a user to grasp the handle and pull the cable to open the valving member.

The second position can be on the exterior of the housing.

Fasteners connect the upper and lower flanges together, each fastener spanning between a smaller diameter upper opening and a smaller diameter lower opening.

In one embodiment, the valving member includes a flexible disk.

In one embodiment, the valving member includes a valve disk having upper and lower surfaces, a bracket on the upper surface of the disk and wherein said cable attaches to said bracket in said first position.

In one embodiment, the bracket can be connected to the disk with a bolted connection.

In one embodiment, a weighted member can be attached to the lower surface of the disk.

In one embodiment, the bracket can be connected to the disk and the weighted member with a bolted connection.

In one embodiment, the cable opening can extend through the upper flange.

In one embodiment, the upper flange can have a top surface and the cable opening forms an acute angle with the top surface of the upper flange.

In one embodiment, the valving member includes a valve peripheral portion that can be in between the cylindrical section and the lower flange.

In one embodiment, a flange handle can be provided on the upper flange in between the upper flange periphery and the cylindrical section, the flange handle enabling a user to grip the flange at the handle and move the housing.

Another embodiment provides a foot or float valve apparatus having valve housing with an exterior and an interior with a flow bore having a central axis.

The housing has upper and lower end portions.

A valving member can be pivotally mounted to the valve housing with a pivotal connection that is next to the lower end portion and movable between open flow and closed flow positions.

A valve seat can be provided, the valving member engaging the seat in the closed flow position.

A cable can be connected to the valving member opposite the pivotal connection, the cable extending diagonally with respect to the bore central axis and forming an acute angle with the bore central axis.

The housing has a cable opening at a position vertically above the pivotal connection. The cable opening extends through the upper flange.

The cable extends from the first position to a second position, passing through the cable opening.

A cable handle on the cable can be at the second position. The cable handle enables a user to grasp the handle and pull the cable.

The second position can be on the exterior of the housing.

The present invention thus provides a foot or float valve of improved configuration, with the following advantages:

1. Reduction in lift vacuum required to achieve same gallon per minute while saving engine horse power for pressure and gallons per minute (gpm) output.

2. Increased gallons per minute output of a jet pump such as a Peerless jet pump. For example, one jet pump can run two one inch jet nozzles at 350 psi with the present invention as part of the pumping system.

3. The jet pump no longer cavitates. There is no damage to pump housing, sh aft, bearing and impellers.

4. Fuel savings for customers because engines are not required to run as hard to achieve the required gallons per minute (gpm) and pressure or psi.

5. Increase engine and pump life reducing repair cost.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
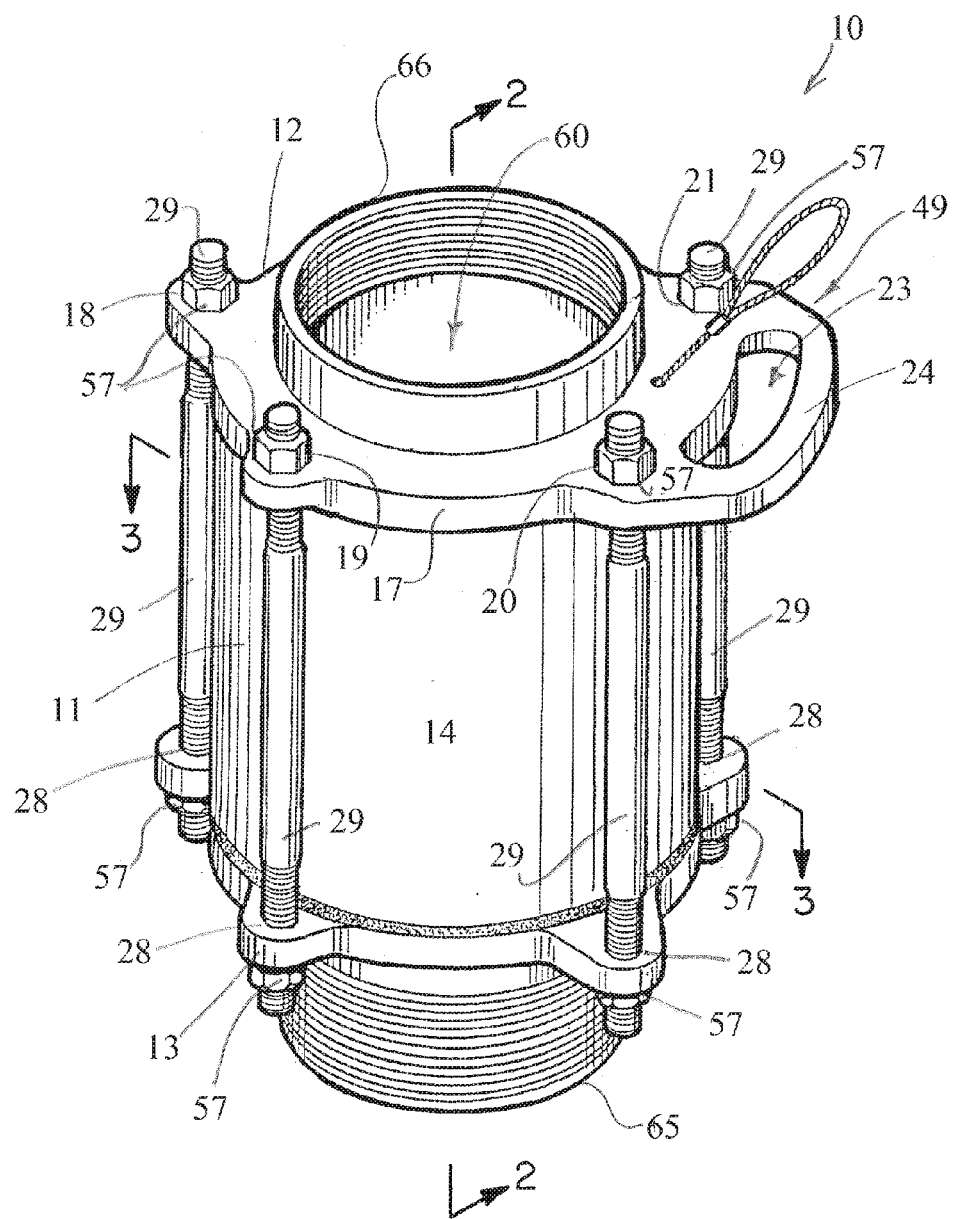
FIG. 1 is a perspective elevation view of a preferred embodiment of the present invention.

FIGS. 1-7 show a preferred embodiment of the apparatus of the present invention designated generally by the numeral 10. Valve apparatus 10 includes a housing 11 which can be comprised of an upper flange 12, a lower flange 13 and a cylindrically shaped section 14. Housing 11 has open ended bore 60.

Figure 2:
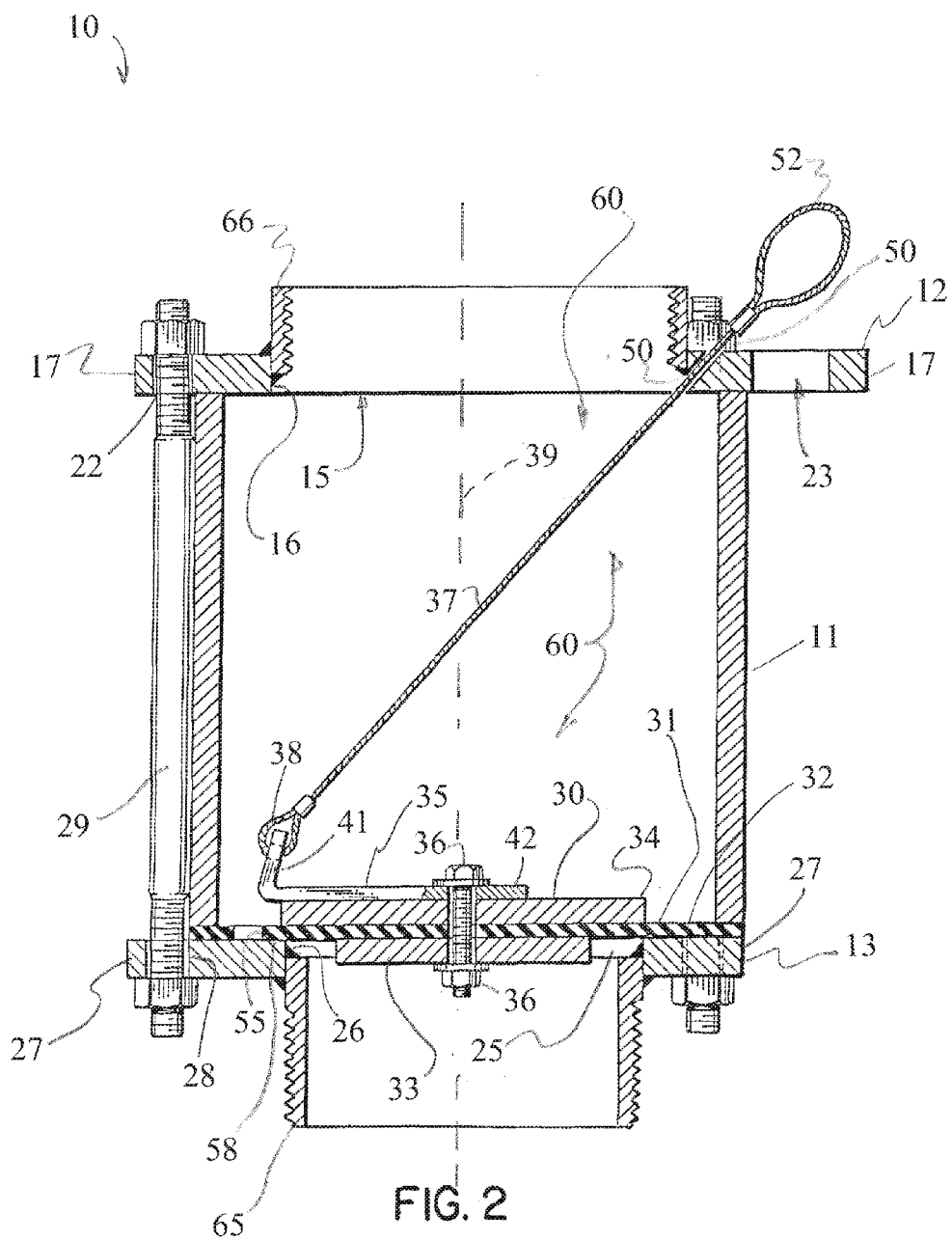
FIG. 2 is a sectional view of a preferred embodiment of the apparatus of the present invention taken along lines 2-2 of FIG. 1.

In FIG. 2, upper flange 12 has a central opening 15 surrounded by inner annular or circular edge 16. Flange 12 has outer edge 17. In between edges 16 and 17 are a plurality of openings 18-22. Curved slot 23 can also be in between edge 16 and edge 17. The slot 23 and narrow section 24 define a handle section 49 as will be described more fully hereinafter. A user is able to grasp the handle section 49 by placing his or her fingers into slot 23 and holding narrow section 24.

Lower flange 13 has a central opening 25 surrounded by inner edge 26. Flange 13 has outer edge 27. A plurality of openings 28 are positioned in between the inner edge 26 and outer edge 27. A plurality of fasteners such as rods 29 are provided. Each rod 29 extends from an opening 18-22 in upper flange 12 to an opening 28 in lower flange 13 (see FIG. 1). Bolts 57 attached to threaded ends of the rods 29 can be tightened to compress section 14 in between flanges 12, 13.

Figure 4:
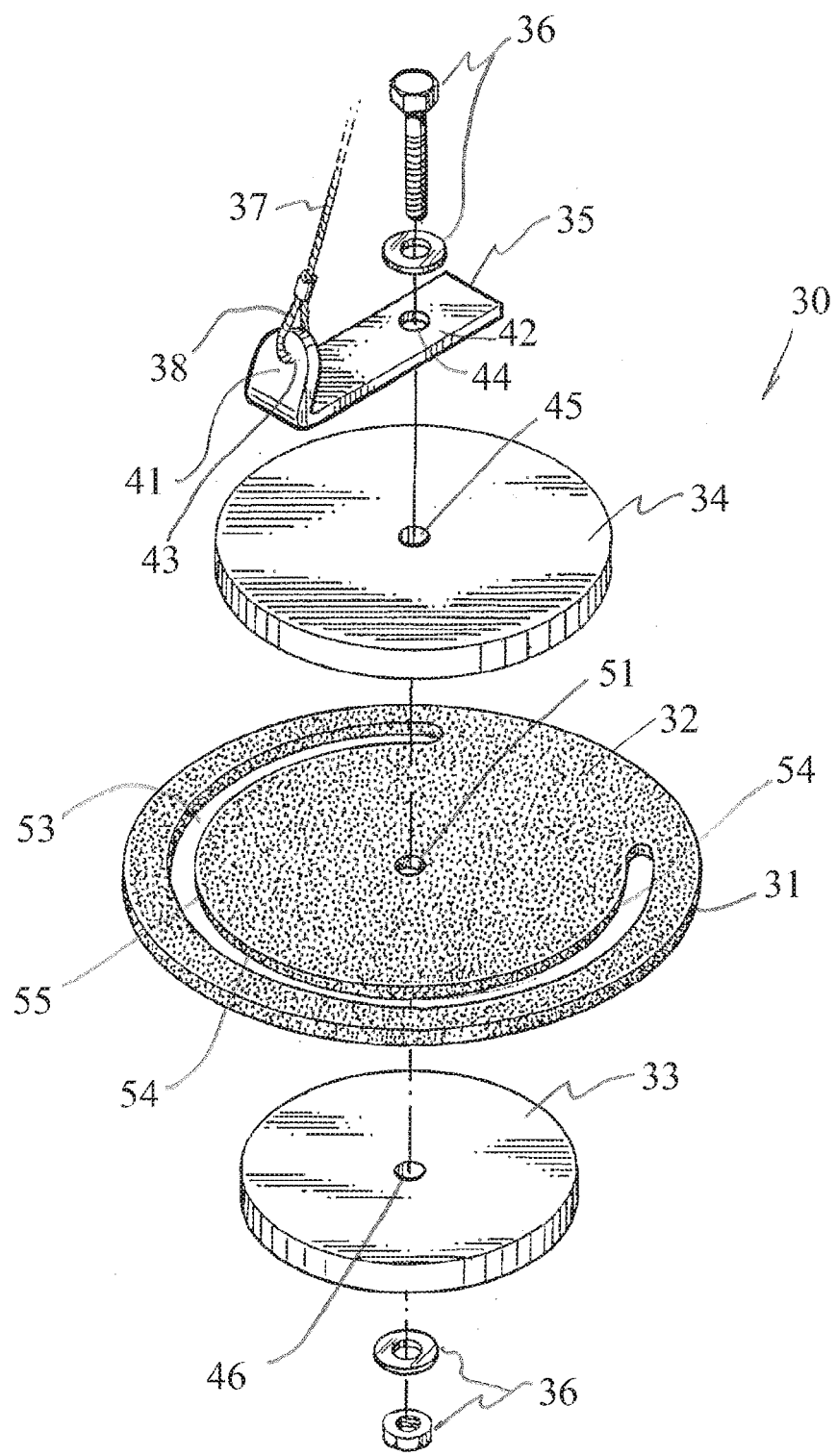
FIG. 4 is a partial exploded perspective view of a preferred embodiment of the apparatus of the present invention.
Figure 5:
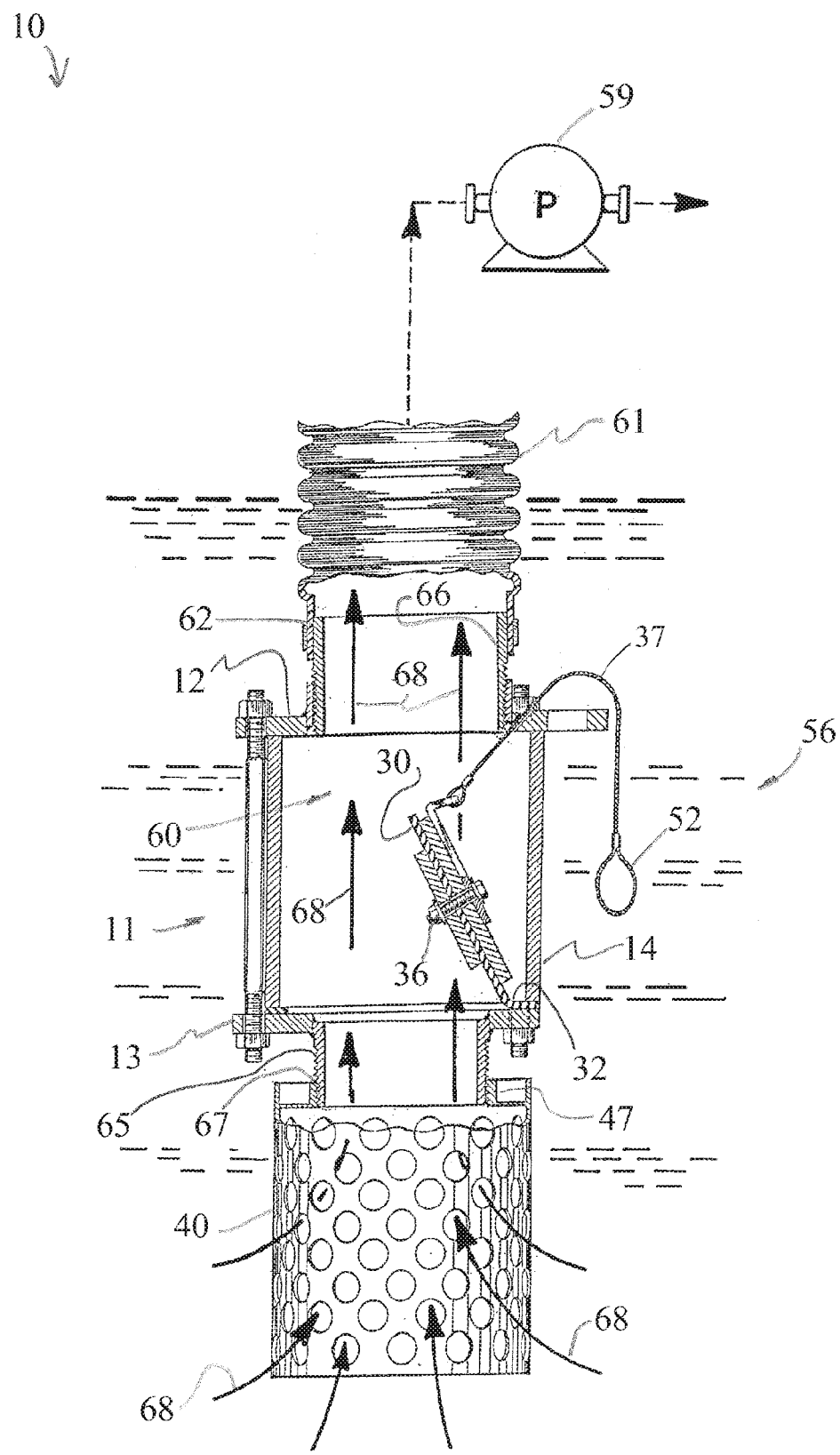
FIG. 5 is an elevation view of a preferred embodiment of the apparatus of the present invention.
Figure 6:
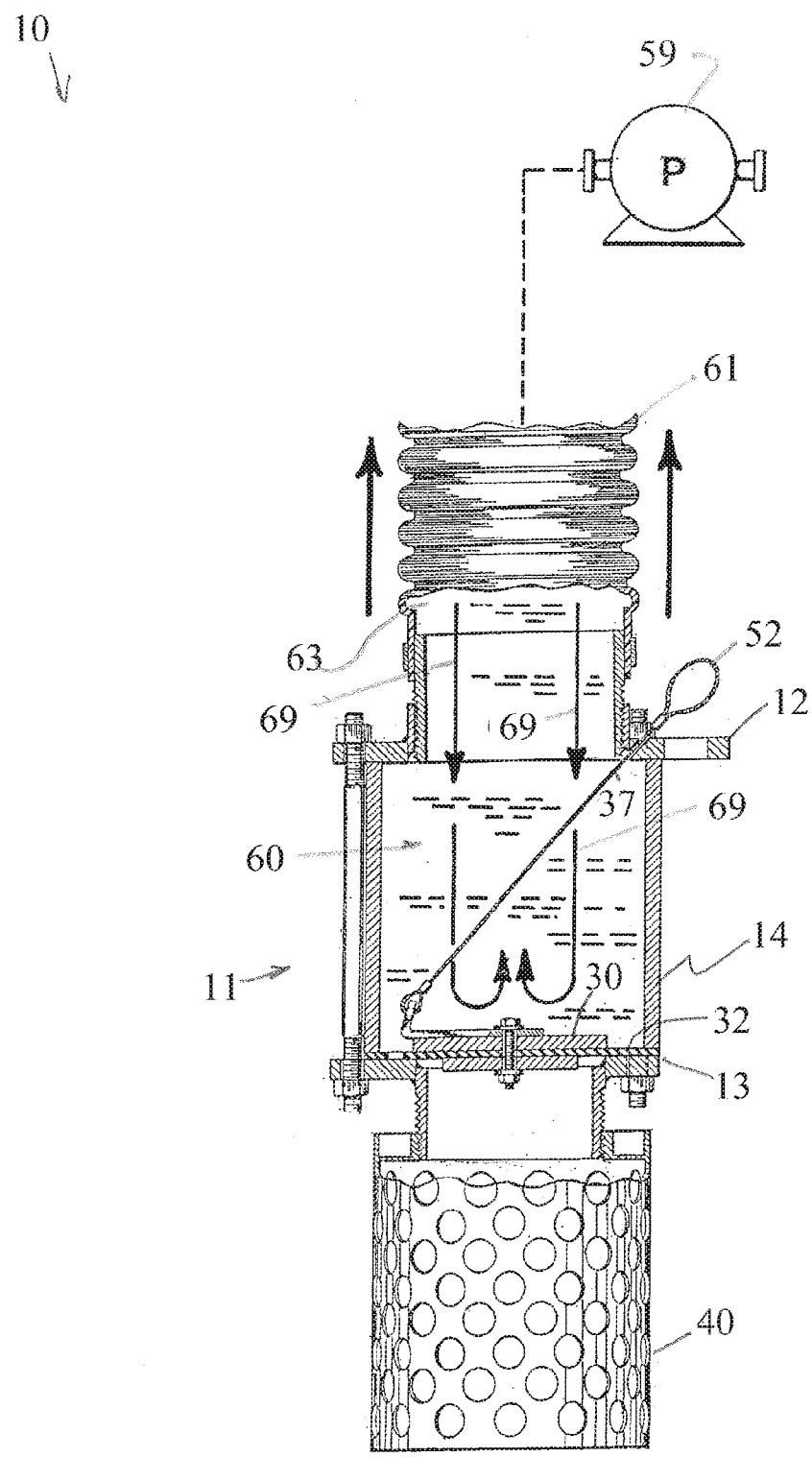
FIG. 6 is an elevation view of a preferred embodiment of the apparatus of the present invention.
Figure 7:
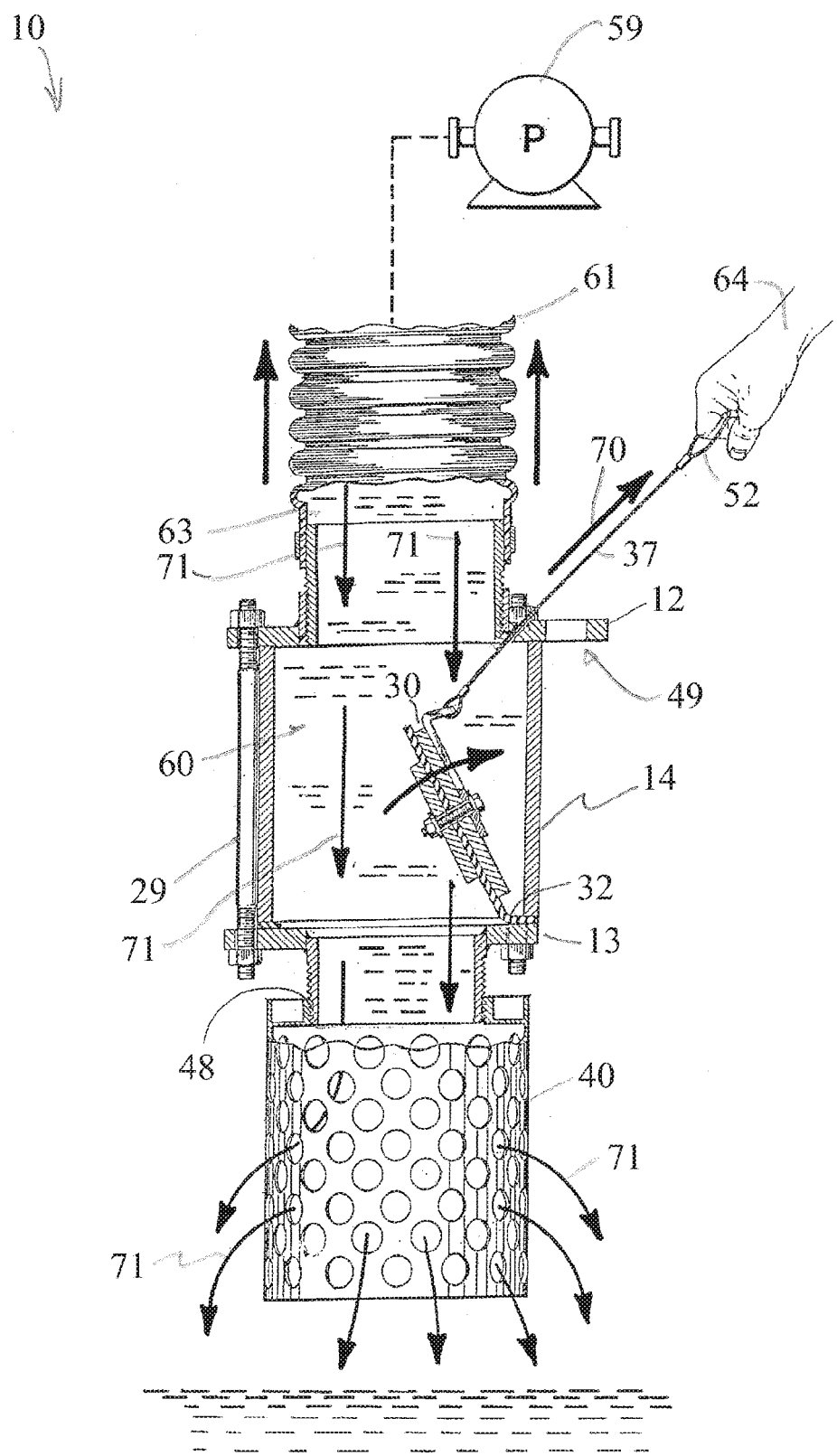
FIG. 7 is an elevation view of a preferred embodiment of the apparatus of the present invention.

Valving member 30 can be pivotally attached to housing 11 next to lower flange 13 (see FIGS. 5-7). Valving member 30 (FIGS. 2-7) includes disk 31 which is pivotally attached to housing 11 at hinge or pivot 32. Disk 31 is provided with top and bottom plates or weights 33, 34. A bracket 35 is affixed to the upper surface of upper plate 34. The combination of plates or weights 33, 34, disk 31 and bracket 35 can be connected together using a bolted connection 36. Cable 37 enables the valving member 30 to be opened.

The cable 37 is attached at one end portion (e.g., bolted connection or loop at 38) to flange 41 of bracket 35 (see FIGS. 2, 4). The bracket 35 has a smaller flange 41 connected to a larger flange 42. Flange 41 forms an acute angle with flange 42. Each of the flanges 41, 42 has an opening. Flange 41 has opening 43. Flange 42 has opening 44. A bolted connection or loop 38 can be used to connect cable 37 to flange 41 at opening 43.

Figure 3:
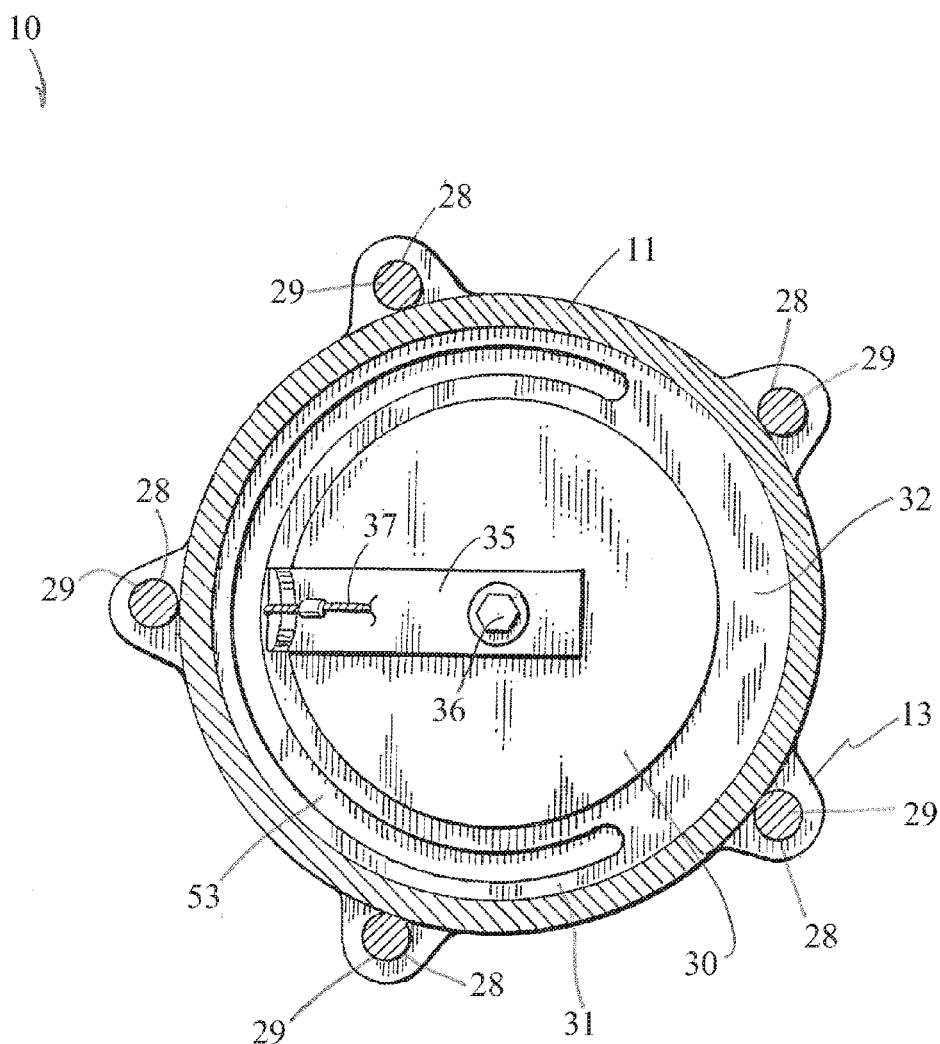
FIG. 3 is a top view of a preferred embodiment of the apparatus of the present invention.

Bolted connection 36 can be used to assemble valve disk 31, upper plate 34, lower plate 33, and bracket 35. Bolted connection 36 can include a bolt, nut and one or more washers. In FIGS. 2-4, the bolted connected 36 extends through opening 44 of flange 42 of bracket 35, opening 45 of top plate 34, opening 51 of disk 31 and opening 46 in bottom plate 33. Notice in FIG. 2 that cable 37 forms an acute angle with central axis 39 of housing 11 inside bore 60.

A strainer or filter basket 40 can be provided (see FIG. 5-7), connected (e.g., threaded or bolted) to the bottom of lower flange 13. Filter basket or strainer 40 can provide an annular flange 47 or other connector that attaches filter basket 40 to lower pipe 65 (see FIG. 5). In FIG. 5-7, basket or strainer 40 can be seen having flange 47 with threads 48 that enable it to be connected to lower pipe 65 at threaded connection 67.

The upper end portion of cable 37 passes through cable opening 50 in upper flange 12. Above flange 12, cable 37 can be provided with a loop or handle 52 that the can be grasped and pulled by a user 64.

In FIGS. 3-4, disk 31 has central opening 51, an arcuate slot 53, and a hinge or pivot 32. In FIG. 1-2, the cylindrical section 14 of housing 11 covers the slot 53 while allowing a central portion 54 of the disk 31 to move between open flow (FIG. 5) and closed flow (FIG. 6) positions.

When in a closed position (FIG. 6), a peripheral edge 55 of central portion 54 forms a seal at 58 with lower flange 13 (see FIG. 2). In an open position, the assembly of disk 31, plates 33, 34, bracket 35 and bolted connection 36 pivot to the position shown in FIG. 5 as open position 56. Arrows 68 in FIG. 5 show water flow or fluid flow when valving member 30 is in open position 56. In FIG. 5, a discharge hose 61 connects valve apparatus 10 to pump 59. Hose 61 can connect to upper pipe section 66 using a clamped or threaded or other connection at 62.

In FIG. 6, arrows 69 illustrate that pump 59 is not pumping, wherein valve 30 closes and water or fluid is retained in bore 60 of housing 11 and in bore 63 of discharge hose 61. Because water or fluid in bores 60, 63 can have substantial weight, lifting of hose 61 and valve 10 could injure a worker or technician or user. In FIG. 7, the user 64 pulls cable 37 in the direction of arrow 70 to open valving member 30 and drain bores 60, 63 (see arrows 71) thus eliminating the fluid or water weight. A user 64 could then lift valve 10 and hose 61 by grasping handle section 49.

The following is a list of parts and materials suitable for use in the present invention:

| PARTS LIST: | |
|---|---|
| PART NUMBER | DESCRIPTION |
| 10 | valve apparatus |
| 11 | housing |
| 12 | upper flange |
| 13 | lower flange |
| 14 | cylindrical section |
| 15 | central opening |
| 16 | inner annular/circular edge |
| 17 | outer edge |
| 18 | opening |
| 19 | opening |
| 20 | opening |
| 21 | opening |
| 22 | opening |
| 23 | slot |
| 24 | narrow section |
| 25 | central opening |
| 26 | inner edge |
| 27 | outer edge |
| 28 | opening |
| 29 | rod/fastener/threaded fastener |
| 30 | valving member |
| 31 | disk |

-continued

PARTS LIST:

| PART NUMBER | DESCRIPTION |
|---|---|
| 32 | hinge/pivot |
| 33 | lower plate/weight |
| 34 | upper plate/weight |
| 35 | bracket |
| 36 | bolted connection |
| 37 | cable |
| 38 | loop/bolted connection |
| 39 | central axis |
| 40 | filter basket/strainer |
| 41 | flange |
| 42 | flange |
| 43 | opening |
| 44 | opening |
| 45 | opening |
| 46 | opening |
| 47 | annular flange/connector |
| 48 | threads |
| 49 | handle section |
| 50 | cable opening |
| 51 | disk central opening |
| 52 | loop/handle |
| 53 | arcuate slot |
| 54 | central portion |
| 55 | peripheral edge |
| 56 | open position |
| 57 | bolt |
| 58 | seal |
| 59 | pump |
| 60 | housing bore |
| 61 | discharge hose |
| 62 | connection |
| 63 | bore |
| 64 | user |
| 65 | lower pipe section |
| 66 | upper pipe section |
| 67 | threaded connection |
| 68 | arrow |
| 69 | arrow |
| 70 | arrow |
| 71 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A foot valve apparatus, comprising:
   a) a valve housing having an upper flange, a lower flange and a cylindrical section, said valve housing having an exterior and an interior with a flow bore having a central axis;
   b) the upper flange having a periphery, an upper larger diameter central opening and a plurality of circumferentially spaced smaller diameter upper openings, each smaller diameter upper opening being spaced in between the periphery and the upper larger diameter opening;
   c) the lower flange having a periphery, a lower larger diameter central opening and a plurality of circumferentially spaced smaller diameter lower openings, each smaller diameter lower opening spaced in between the periphery and the lower larger diameter opening;
   d) the cylindrical section having upper and lower end portions, wherein the upper end portion contacts the upper flange in between the upper larger diameter central opening and the plurality of circumferentially spaced smaller diameter upper openings;
   e) wherein the lower end portion contacts the lower flange in between the lower larger diameter central opening and the plurality of circumferentially spaced smaller diameter lower openings;
   f) a valving member pivotally mounted to the valve housing with a pivotal connection that is next to the lower end portion of the cylindrical section and movable between open flow and closed flow positions, wherein the lower flange provides a valve seat that is spaced inwardly of said cylindrical section, said valving member engaging said seat in the closed flow position;
   g) a cable connected to the valving member opposite the pivotal connection, the cable extending diagonally with respect to said bore central axis and forming an acute angle therewith;
   h) a cable opening through the upper flange at a first position vertically above the pivotal connection;
   I) wherein said cable extends from the first position to a second position, passing through the cable opening nearer said second position and spaced away from said first position;
   j) a cable handle on the cable at the second position that enables a user to grasp the handle and pull the cable;
   k) wherein the second position is on the exterior of said housing; and
   l) fasteners that connect the upper and lower flanges together, each fastener spanning between a said smaller diameter upper opening and a said smaller diameter lower opening.

2. The foot valve apparatus of claim 1 wherein the valving member includes a flexible disk.

3. The foot valve apparatus of claim 1 wherein the valving member includes a valve disk having upper and lower surfaces, a bracket on the upper surface of the disk and wherein said cable attaches to said bracket in said first position.

4. The foot valve apparatus of claim 3 wherein the bracket is connected to the disk with a bolted connection.

5. The foot valve apparatus of claim 3 wherein a weighted member is attached to the lower surface of the disk.

6. The foot valve apparatus of claim 5 wherein the bracket is connected to the disk and the weighted member with a bolted connection.

7. The foot valve apparatus of claim 1 wherein the cable opening extends through the upper flange.

8. The foot valve apparatus of claim 7 wherein the upper flange has a top surface and the cable opening forms an acute angle with the top surface of the upper flange.

9. The foot valve apparatus of claim 1 wherein the valving member includes a valve peripheral portion that is in between the cylindrical section and the lower flange.

10. The foot valve apparatus of claim 1 further comprising a flange handle on the upper flange in between the upper flange periphery and the cylindrical section, said flange handle enabling a user to grip the upper flange at the handle and move the housing.

* * * * *